J. S. MOOREHEAD.
BICYCLE TRANSMISSION.
APPLICATION FILED MAR. 25, 1921.
1,431,977.
Patented Oct. 17, 1922.
3 SHEETS—SHEET 1.
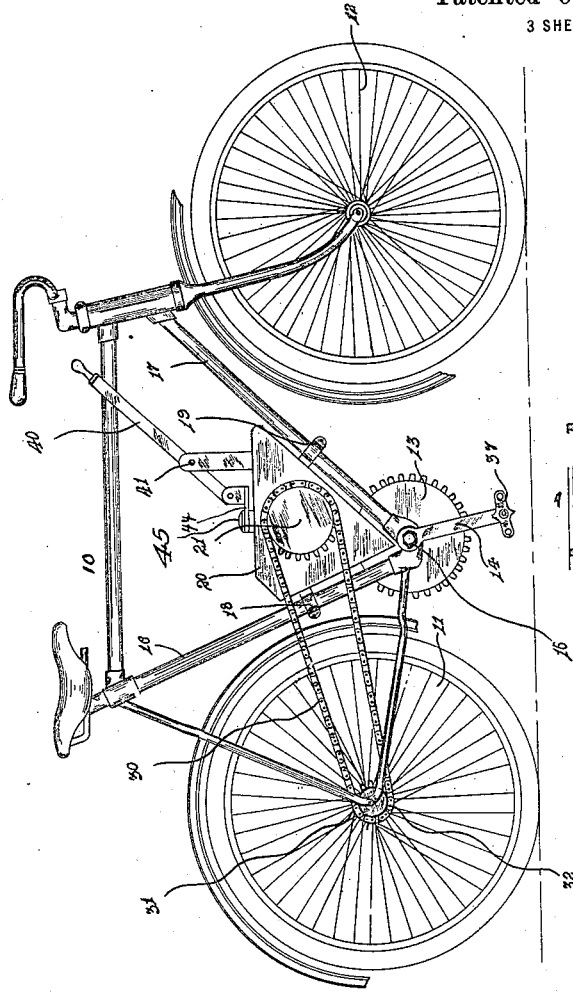
John S. Moorehead
INVENTOR
BY E. M. Bond
ATTORNEY.

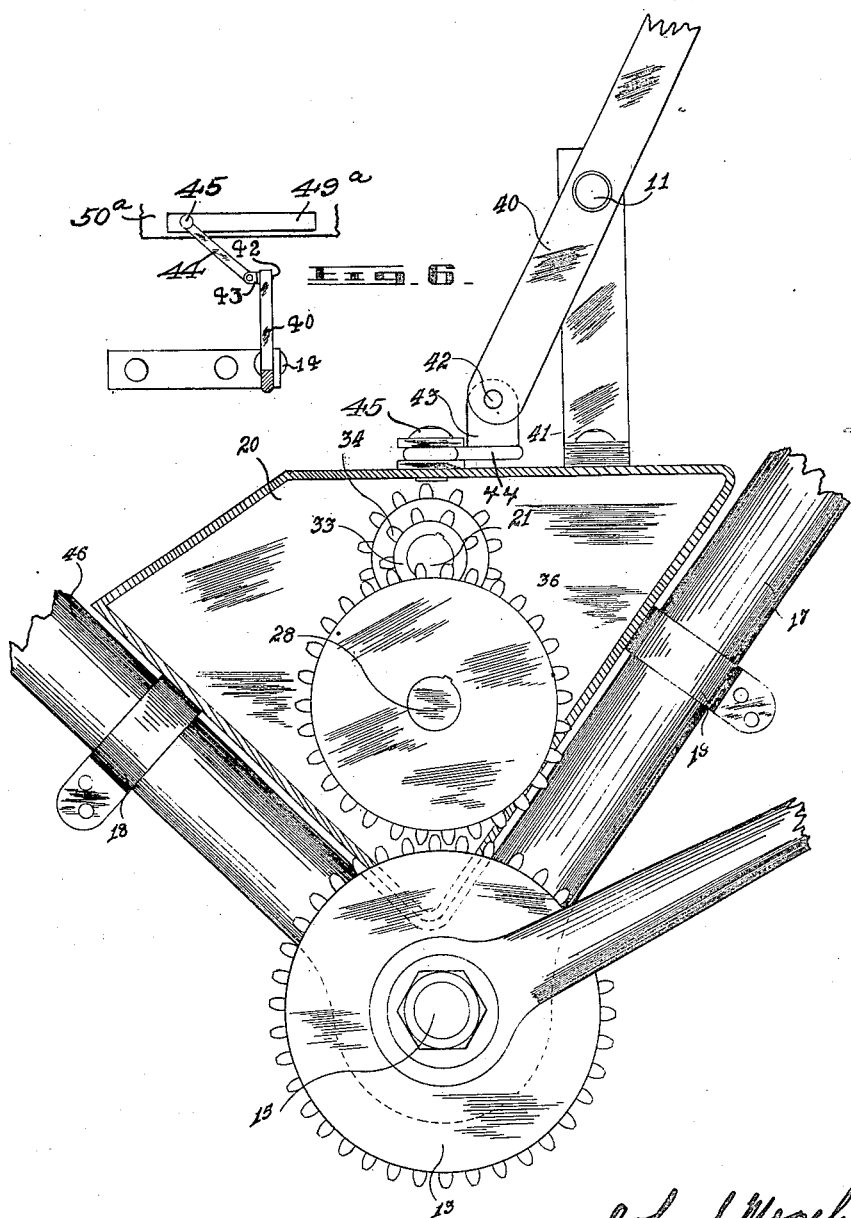

J. S. MOOREHEAD.
BICYCLE TRANSMISSION.
APPLICATION FILED MAR. 25, 1921.

1,431,977.

Patented Oct. 17, 1922.
3 SHEETS—SHEET 3.

John S. Moorehead
INVENTOR.

BY E. M. Bond
ATTORNEY.

Patented Oct. 17, 1922.

1,431,977

UNITED STATES PATENT OFFICE.

JOHN S. MOOREHEAD, OF LANGRUTH, MANITOBA, CANADA.

BICYCLE TRANSMISSION.

Application filed March 25, 1921. Serial No. 455,466.

*To all whom it may concern:*

Be it known that I, JOHN S. MOOREHEAD, a citizen of the Dominion of Canada, residing at Langruth, in the county of Dauphin and Province of Manitoba, Canada, have invented certain new and useful Improvements in Bicycle Transmission, of which the following is a specification.

The present invention relates to improvements in bicycle transmission and the principal object is to provide a changeable two speed mechanism, which is adapted for instantaneous adjustment by the rider of the bicycle.

Another object is to provide a transmission of the character described, which may be actuated to increase or decrease the gear ratio in a simple and positive manner and wherein friction of the operative parts is reduced to a minimum.

With these and other objects in view, the invention consists in the construction, combination and arrangements of parts as will be hereinafter fully described, illustrated in the accompanying drawings, and pointed out in the claims hereunto appended.

Figure 1 is a detail elevation of a bicycle embodying my improved transmission mechanism.

Fig. 2 is a magnified detail section of a part of the transmission mechanism.

Fig. 6 is detail view of a part of the shifting mechanism.

Referring to the drawings like numerals designate like parts in the various drawings.

Figure 4:
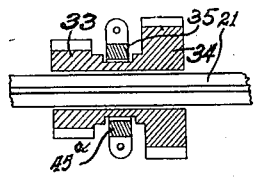
Fig. 4 is a horizontal section through the shifting gear elements.
Figure 5:
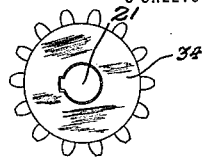
Fig. 5 is an end elevation of the same.
Figure 3:
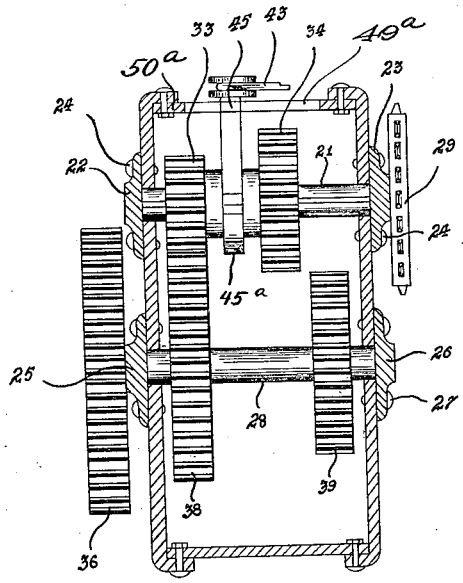
Fig. 3 is a transverse section through the transmission casing.

The transmission mechanism is adapted for connection to a bicycle which comprises the usual frame 10, which latter is supported upon the wheels 11 and 12. In this instance, however, the ordinary sprocket is dispensed with and a drive sprocket 13 is substituted, which is driven by the pedal cranks 14 keyed on shaft 15, secured to the angularly disposed frame bars 16 and 17, by the strap members 18 and 19 is a triangular shaped transmission casing 20, in which is mounted the transmission to be now described.

A shaft 21 is journaled in the bearing plates 22 and 23, secured by bolts 24 to the said transmission casing 20. Likewise, journalled in plates 25 and 26 secured to the said casing 20 by bolts 27, is a shaft 28. The shaft 21, on the end which extends from the casing 20, carries a sprocket 29 around which is trained a chain 30 and this chain is likewise trained around a small sprocket 31 on shaft 32, which carries the rear wheel 11. A shiftable transmission element comprises a small gear 33 and a larger gear 34, the two gears being formed integral and the metal between the same gears is reduced to form a channel 35, the function of which will be later described.

A large gear 36 is keyed to the outer projecting end of shaft 29, which latter meshes with the drive sprocket 13 on shaft 15 which is actuated in the ordinary manner by the pedals 37. Gears 38 and 39 are keyed on shaft 28 and this large gear 38 normally is in meshing engagement with the small gear 33 on shaft 21.

Motion is transmitted from the drive sprocket 13 to the gear 36 and in turn imparted to gear 38 on shaft 28. As gear 38 is normally in mesh with the small gear 33, it transmits motion to shaft 21 and sprocket 29 and actuates the chain 30 for driving the bicycle at high speed.

When it is desired to reduce the gear ratio for hill climbing and the like, I provide gear shifting mechanism which will now be described.

A lever 40 is pivotally mounted on an upright 41, connected to the top of the transmission casing 20 and said lever 40, at its lower end has pin connection 42 with the upright part 43, of a link member 44. The member 44 is actuated by the shifting lever 40 and is connected with the member 45ª located in the channel 35, as seen in Figure 4, by means of the vertical member 45, which latter is movable in a slot 49ª in the wall 50ª of the casing. By adjusting lever 40 in one direction, the gear 33 will be adjusted out of engagement with the gear 38, while gear 34 is shifted into engagement with the gear 39 on shaft 28, and thus, as the two relatively small gears 34 and 39 are in engagement the ratio is reduced.

It is obvious, that this transmission adjustment may be quickly made while the bicycle is being propelled by the rider and by simply moving the lever 40 the gears 33 and 34 will be shifted upon the shaft 21 to their various positions according to the operation of the lever 40, and the gears may be changed from high to low or vice-versa.

From the foregoing it is thought that the construction of my invention will be clearly understood, and, therefore, a more extended explanation has been omitted.

Having thus described the invention what I claim as new, is:—

1. The combination with a bicycle having a pedal crank shaft, of a drive gear on said shaft, a casing arranged on said bicycle, shafts mounted in said casing, a gear on one of said shafts, said gear meshing with said drive gear, a sprocket on the other of said shafts, and gears arranged on said shafts within said casing for driving said sprocket.

2. The combination with a bicycle having a pedal crank shaft, of a drive gear on said shaft, a casing arranged on said bicycle, shafts mounted in said casing, a gear on one of said shafts, said gear meshing with said drive gear, a sprocket on the other of said shafts, and gears arranged on said shafts within said casing for driving said sprocket, and means for shifting said gears to increase or decrease the gear ratio.

3. The combination with a bicycle having a pedal crank shaft, of a drive gear on said shaft, a casing arranged on said bicycle, shafts mounted in said casing, a gear on one of said shafts, said gear meshing with said drive gear, a sprocket on the other of said shafts, and gears arranged on said shafts within said casing for driving said sprocket, and a lever on said casing for shifting said gears to increase or decrease the gear ratio.

In testimony whereof I affix my signature in the presence of two witnesses.

JOHN S. MOOREHEAD.

Witnesses:
H. D. SPARLING,
E. M. CORNALL.